(12) United States Patent
Teng

(10) Patent No.: US 11,977,516 B2
(45) Date of Patent: May 7, 2024

(54) SYSTEMS AND METHODS FOR DATA STORAGE

(71) Applicant: ZHEJIANG DAHUA TECHNOLOGY CO., LTD., Zhejiang (CN)

(72) Inventor: Kaien Teng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 283 days.

(21) Appl. No.: 17/317,843

(22) Filed: May 11, 2021

(65) Prior Publication Data
US 2021/0263893 A1 Aug. 26, 2021

Related U.S. Application Data

(63) Continuation of application No. PCT/CN2019/105060, filed on Sep. 10, 2019.

(30) Foreign Application Priority Data

Dec. 24, 2018 (CN) .......................... 201811581419.5

(51) Int. Cl.
*G06F 16/17* (2019.01)
*G06F 16/16* (2019.01)

(52) U.S. Cl.
CPC .......... *G06F 16/1727* (2019.01); *G06F 16/16* (2019.01)

(58) Field of Classification Search
CPC .............................. G06F 16/1727; G06F 16/16
See application file for complete search history.

(56) References Cited

U.S. PATENT DOCUMENTS 5,651,133 A * 7/1997 Burkes .................. G06F 12/121
711/E12.07
5,802,599 A * 9/1998 Cabrera ................ G06F 3/0611
711/170
(Continued)

FOREIGN PATENT DOCUMENTS

CN 101082927 A 12/2007
CN 100418071 C 9/2008
(Continued)

OTHER PUBLICATIONS

The Extended European Search Report in European Application No. 19905839.7 dated Oct. 14, 2021, 9 pages.
(Continued)

*Primary Examiner* — Irete F Ehichioya
*Assistant Examiner* — Huen Wong
(74) *Attorney, Agent, or Firm* — METIS IP LLC

(57) ABSTRACT

The present disclosure relates to a system and method for managing the storage of files in a storage medium of a computing device. The method may comprise detecting a file to be stored in the storage medium. The method may also comprise determining a file assignment mode and a granularity, wherein the granularity includes at least two file system blocks occupying consecutive physical addresses of the storage medium. The method may further comprise allocating one or more storage regions for storing the file based at least on the file assignment mode and the granularity, and storing the file into the allocated one or more storage regions.

14 Claims, 10 Drawing Sheets

400

(56) References Cited

U.S. PATENT DOCUMENTS

| | | | | |
|---|---|---|---|---|
| 5,940,838 | A * | 8/1999 | Schmuck | G06F 12/0862 |
| 6,430,135 | B1 * | 8/2002 | Kelly | H04N 5/76 |
| | | | | 369/47.13 |
| 7,814,128 | B2 * | 10/2010 | Silvers | G06F 16/10 |
| | | | | 707/812 |
| 7,853,543 | B2 * | 12/2010 | Bryant | G06F 9/5016 |
| | | | | 706/14 |
| 7,865,485 | B2 * | 1/2011 | Mullick | G06F 16/1774 |
| | | | | 707/827 |
| 8,407,265 | B1 * | 3/2013 | Scheer | G06F 16/1727 |
| | | | | 711/170 |
| 8,566,371 | B1 * | 10/2013 | Bono | G06F 16/119 |
| | | | | 707/822 |
| 9,021,229 | B2 * | 4/2015 | Ananthanarayanan | |
| | | | | G06F 3/067 |
| | | | | 711/171 |
| 9,218,135 | B2 * | 12/2015 | Miller | G06F 3/0676 |
| 9,323,462 | B2 * | 4/2016 | Olson | G06F 3/0685 |
| 9,454,536 | B1 * | 9/2016 | Rao | G06F 16/1724 |
| 10,740,016 | B2 * | 8/2020 | White | G06F 3/0685 |
| 11,316,136 | B2 * | 4/2022 | Gong | H10K 71/00 |
| 2002/0006265 | A1 * | 1/2002 | Beyrouti | H04N 21/234309 |
| | | | | 386/233 |
| 2004/0225855 | A1 * | 11/2004 | Branch | G06F 3/0608 |
| | | | | 711/170 |
| 2004/0236897 | A1 * | 11/2004 | Cheng | G06F 12/0246 |
| | | | | 711/E12.008 |
| 2005/0069292 | A1 * | 3/2005 | Yokota | G06F 3/061 |
| | | | | 386/326 |
| 2007/0156998 | A1 * | 7/2007 | Gorobets | G06F 12/0246 |
| | | | | 711/170 |
| 2007/0208893 | A1 * | 9/2007 | Azzarello | G06F 16/1744 |
| | | | | 710/68 |
| 2008/0052329 | A1 | 2/2008 | Dodge et al. | |
| 2008/0155205 | A1 * | 6/2008 | Gokhale | H04L 67/56 |
| | | | | 711/154 |
| 2008/0252930 | A1 * | 10/2008 | Kakoi | H04N 1/32496 |
| | | | | 358/1.16 |
| 2009/0235041 | A1 * | 9/2009 | Harris | G06F 3/064 |
| | | | | 711/170 |
| 2009/0307250 | A1 * | 12/2009 | Koifman | G06F 21/62 |
| 2010/0082537 | A1 * | 4/2010 | Lasser | G06F 16/13 |
| | | | | 707/610 |
| 2010/0125697 | A1 | 5/2010 | Lee et al. | |
| 2010/0312807 | A1 * | 12/2010 | Mitsuzumi | G06F 16/116 |
| | | | | 707/E17.143 |
| 2011/0022645 | A1 * | 1/2011 | Maeda | G06F 16/13 |
| | | | | 707/822 |
| 2011/0125719 | A1 * | 5/2011 | Jayaraman | G06F 16/1748 |
| | | | | 707/822 |
| 2011/0219186 | A1 * | 9/2011 | Amit | G06F 3/0608 |
| | | | | 711/117 |
| 2013/0117527 | A1 | 5/2013 | Shu | |
| 2013/0311745 | A1 * | 11/2013 | Harris | G06F 3/064 |
| | | | | 711/171 |
| 2014/0359248 | A1 * | 12/2014 | Peters | G06F 12/0223 |
| | | | | 711/171 |
| 2015/0254013 | A1 | 9/2015 | Chun | |
| 2016/0132268 | A1 * | 5/2016 | Koifman | G06F 12/1408 |
| | | | | 711/170 |
| 2017/0090988 | A1 | 3/2017 | Young et al. | |
| 2018/0144019 | A1 * | 5/2018 | Altaparmakov | G06F 16/2379 |
| 2021/0144226 | A1 * | 5/2021 | De Icaza Amozurrutia | |
| | | | | H04L 69/04 |

FOREIGN PATENT DOCUMENTS

| | | |
|---|---|---|
| CN | 101674334 A | 3/2010 |
| CN | 102650931 A | 8/2012 |
| CN | 103902669 A | 7/2014 |
| CN | 104461914 A | 3/2015 |
| CN | 106446138 A | 2/2017 |
| CN | 107533435 A | 1/2018 |
| CN | 108959055 A | 12/2018 |
| WO | 2020134183 A1 | 7/2020 |

OTHER PUBLICATIONS

International Search Report in PCT/CN2019/105060 dated Nov. 28, 2019, 4 pages.

Written Opinion in PCT/CN2019/105060 dated Nov. 28, 2019, 5 pages.

* cited by examiner

SYSTEMS AND METHODS FOR DATA STORAGE

CROSS-REFERENCE TO RELATED APPLICATIONS

This application is a Continuation of International Application No. PCT/CN2019/105060, filed on Sep. 10, 2019, which claims priority of Chinese Patent Application No. 201811581419.5, filed on Dec. 24, 2018, the contents of which are incorporated herein by reference.

TECHNICAL FIELD

This disclosure generally relates to data storage, and more particularly, relates to a system, method, electronic device, and medium for writing data into a storage medium.

BACKGROUND

A file system (e.g., the management device 110 as illustrated in FIG. 1) is implemented by software for managing and storing file information in an operating system (OS) in a computer system. The file system provides functions such as file creation, file access, file modification, file query, and/or file deletion. At present, a file system block is used as a minimum granularity in the file system for allocating storage regions storing files to be stored. The file system block size in the Linux environment may include 512 bytes, 1 KB, 2 KB, or 4 KB.

In practice, the file system may not obtain specific amount of data of a file to be stored. Thus, upon detecting a file to be stored, only one file system block may be allocated at one time until all the data of the file is written into a storage medium. When the file system allocates storage regions for a plurality of files to be stored at a same time, the data written into the storage medium may be stored with a staggered distribution at physical addresses of the storage medium, and the efficiency of the file system is reduced. With the creation of new files and deletion of old files in the file system, the staggered distribution will become more and more serious, resulting in a high fragmentation rate in the file system, and increasing time for searching the magnetic head on a hard disk as well as increasing time for waiting for data to be read, which affects the performance of the file system. Thus, there is a need for a system and method for data storage in a more efficient and feasible manner.

SUMMARY

According to an aspect of the present disclosure, a method for managing the storage of files in a storage medium of a computing device is provided. The method may comprise detecting a file to be stored in the storage medium; determining a file assignment mode and a granularity, wherein the granularity includes at least two file system blocks occupying consecutive physical addresses of the storage medium; allocating one or more storage regions for storing the file based at least on the file assignment mode and the granularity; and storing the file into the allocated one or more storage regions.

In some embodiments, the file assignment mode is a single granularity mode or a multiple granularity mode.

In some embodiments, the single granularity mode relates to a first granularity size.

In some embodiments, the multiple granularity mode relates to a second granularity size, which is a variable.

In some embodiments, the second granularity size is determined according to a type of the file.

In some embodiments, the second granularity size is further determined according to the content of the file, a format of the file, a name of the file, or an attribute of the file.

In some embodiments, the method further comprises obtaining a size of the file if the size of the file is detectable; and calculating the number of the storage regions for storing the file based on the file assignment mode, the granularity, and the size of the file.

In some embodiments, the method further comprises if the size of the file is undetectable, allocating a storage region of the current granularity for storing the file, and writing the data of the file into the storage region; determining whether data currently written into the storage region fills the allocated storage region; and in response to the determination that the data currently written into the storage region does not fill the allocated storage region, stopping the allocation of storage regions for the data of the file.

In some embodiments, the method further comprises if the file is a directory file, determining a folder corresponding to the file to be stored; obtaining a pre-stored target granularity regarding the folder; determining whether the granularity is consistent with the pre-stored target granularity; and in response to the determination that the granularity is inconsistent with the target granularity, modifying the target granularity to be the current granularity.

According to another aspect of the present disclosure, a method for storing data in a storage medium is provided. The method may comprise upon detecting a file to be stored, allocating one or more storage regions for storing the file according to a current granularity, wherein the current granularity includes at least two file system blocks occupying consecutive physical addresses; obtaining data of the file to be stored; and writing the data to the allocated storage region.

In some embodiments, the current granularity has a first granularity size or a second granularity size, the first granularity size is a constant, and the second granularity size is set according to a type of the file; if the current granularity is the second granularity size, the one or more storage regions for storing the file according to a current granularity includes identifying the type of the file to be stored; determining a target second granularity size corresponding to the type of the file to be stored; and allocating the one or more storage regions for storing the file according to the target second granularity size.

According to another aspect of the present disclosure, a device for managing the storage of files in a storage medium of a computing device may be provided. The device may be configured to detect a file to be stored in the storage medium; determine a file assignment mode and a granularity, wherein the granularity includes at least two file system blocks occupying consecutive physical addresses of the storage medium; allocate one or more storage regions for storing the file based at least on the file assignment mode and the granularity; and store the file into the allocated one or more storage regions.

According to another aspect of the present disclosure, a device for storing data in a storage medium may be provided. The device may be configured to upon detecting a file to be stored, allocate one or more storage regions for storing the file according to a current granularity, wherein the current granularity includes at least two file system blocks occupying consecutive physical addresses; obtain data of the file to be stored; and write the data to the allocated storage region.

According to a further aspect of the present disclosure, a non-transitory computer readable medium is provided. The non-transitory computer readable medium may comprise at least one set of instructions for managing the storage of files in a storage medium of a computing device, wherein when executed by a device, the at least one set of instructions causes the device to perform a method. The method may comprise detecting a file to be stored in the storage medium; determining a file assignment mode and a granularity, wherein the granularity includes at least two file system blocks occupying consecutive physical addresses of the storage medium; allocating one or more storage regions for storing the file based at least on the file assignment mode and the granularity; and storing the file into the allocated one or more storage regions.

According to a further aspect of the present disclosure, a non-transitory computer readable medium is provided. The non-transitory computer readable medium may comprise at least one set of instructions for storing data in a storage medium, wherein when executed by a device, the at least one set of instructions causes the device to perform a method. The method may comprise upon detecting a file to be stored, allocating one or more storage regions for storing the file according to a current granularity, wherein the current granularity includes at least two file system blocks occupying consecutive physical addresses; obtaining data of the file to be stored; and writing the data to the allocated storage region.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting example embodiments, in which like reference numerals represent similar structures throughout the several views of the drawings, and wherein.

DETAILED DESCRIPTION

Figure 1:
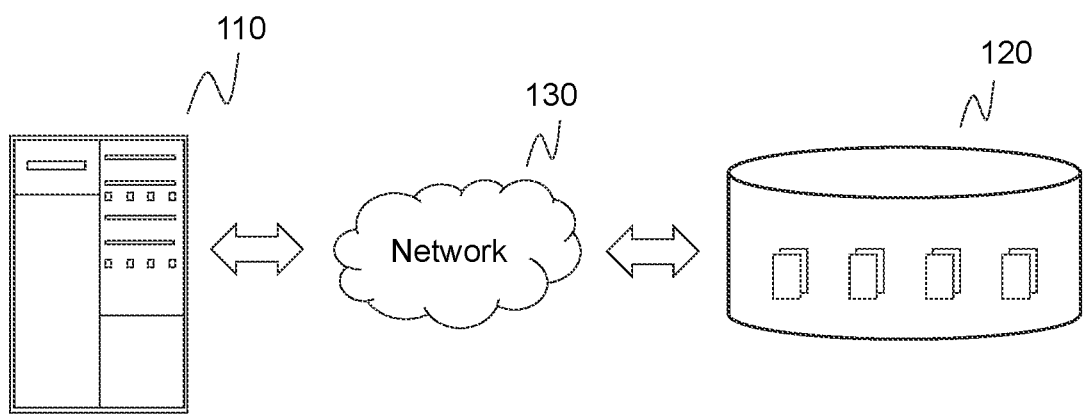
FIG. 1 is a schematic diagram illustrating an exemplary data storage system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In one aspect, the present disclosure is directed to a device and method for data storage. The system may determine a file assignment mode and a granularity for storing a detected file. The granularity includes at least two file system blocks occupying consecutive physical addresses of the storage medium detecting a file to be stored in the storage medium. The system may allocate one or more storage regions for storing the file based at least on the file assignment mode and the granularity, and store the file into the allocated one or more storage regions.

FIG. 1 is a schematic diagram illustrating an exemplary data storage system according to some embodiments of the present disclosure. The data storage system 100 may be configured to store data in a storage medium. As shown, the data storage system 100 may include a management device 110 and a storage medium 120. In some embodiments, the management device 110 may connect with the storage medium 120 through a network 130.

The management device 110 may process data and/or information related to the storage medium 120 or an external data source (e.g., a cloud data center). The management device 110 may communicate with the storage medium 120 to provide various functionality of data management, for example, defragmentation, data recovery, etc. In some embodiments, the management device 110 may perform main functions of the data storage system 100. In some embodiments, the management device 110 may obtain information of files stored in the storage medium 120, and determine a parameter representing an integrity of a file stored in forms of data fragments in the storage medium 120. In some embodiments, the management device 110 may perform other functions related to the method and system described in the present disclosure.

In some embodiments, the management device 110 may include one or more processing units (e.g., single-core processing device(s) or multi-core processing device(s)). Merely by way of example, the management device 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage medium 120 may be a device for storing data, instructions, and/or any other information. In some embodiments, the storage medium 120 may store data obtained from a data source (e.g., a cloud data center, a terminal device, a computing device, a data acquisition device, etc.). For example, the storage medium 120 may store a plurality of videos. In some embodiments, the storage medium 120 may store data and/or instructions that the managing device 110 may execute or use to perform exemplary methods described in the present disclosure.

In some embodiments, the data may be stored in forms of files. A file may be a picture, a video, a text file, a computer program, an application, or the like, or any combination thereof. The storage medium 120 may include a mass storage device, a removable storage device, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Example ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the management device 110 may be a remote device relative to the storage medium 120 that connects to the storage medium 120 over the network 130. In some embodiments, the management device 110 may be a local device relative to the storage medium 120 that is implemented in or assembled together with the storage medium 120.

The network 130 may include any suitable network that can facilitate a communication and/or data transmission between the management device 110 and the storage medium 120. The network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 130 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 130 may include one or more network access points. For example, the network 130 may include wired and/or wireless network access points such as base stations and/or internet exchange points through which an instruction provided by the management device 110 may be transmitted to the storage medium 120.

It should be noted that the above description of the data storage system 100 containing the management device 110 and the storage medium 120 is provided for the purposes of illustration, not intended to limit the scope of the present disclosure. For persons having ordinary skills in the art, components contained in the data storage system 100 may be combined in various ways, or connected with other components as sub-systems, and various variations and modifications may be conducted under the teaching of the present disclosure. However, those variations and modifications may not depart the spirit and scope of this disclosure. For example, the data storage system 100 may further include a terminal device for visually interacting with the management device 110 and/or the storage medium 120. All such modifications are within the protection scope of the present disclosure.

Figure 2:
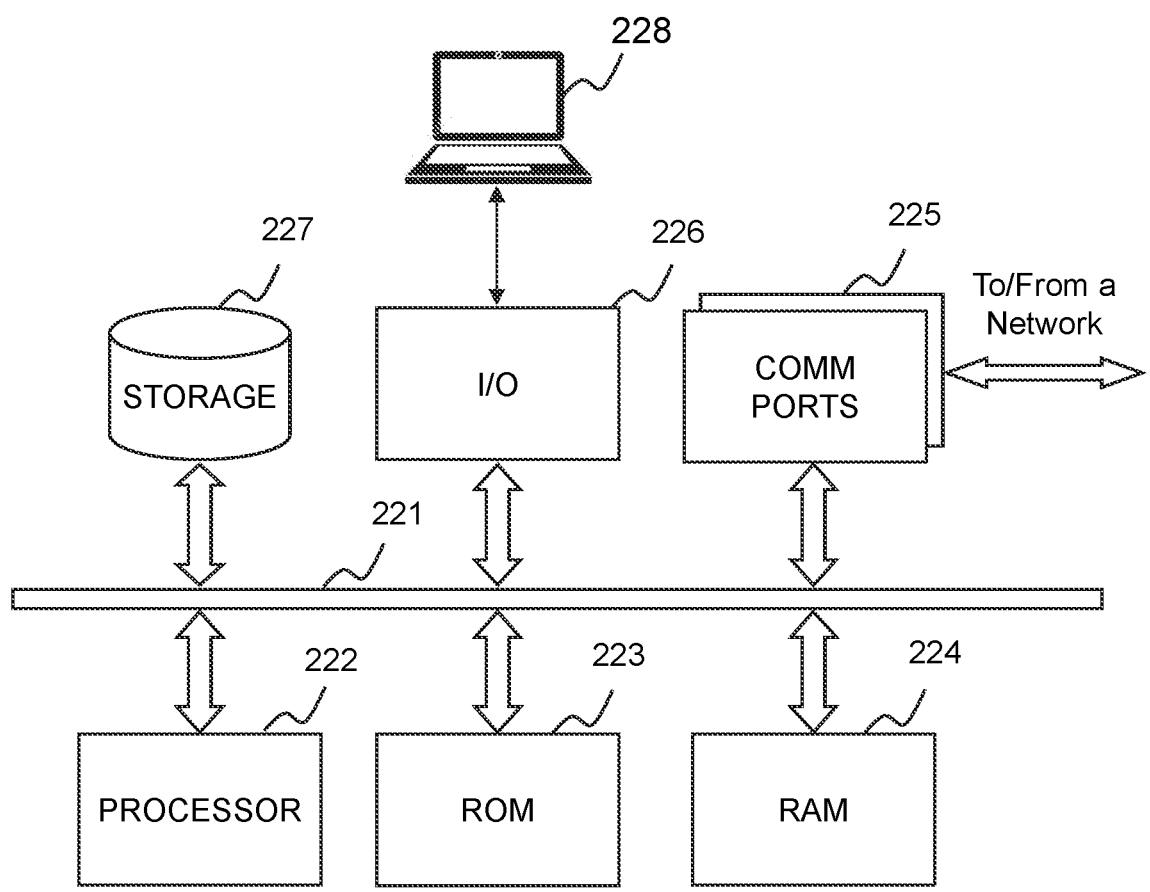
FIG. 2 is a schematic diagram illustrating exemplary hardware and optionally software components of an example computing device according to some embodiments of the present disclosure.

FIG. 2 is a schematic diagram illustrating exemplary hardware and/or software components of an exemplary computing device according to some embodiments of the present disclosure. For example, the computing device 200 may be an implementation of the data storage system 100 including the management device 110 specialized in storage management and the storage medium 120 for storing files. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure. For example, the storage 222 may store a program for the processing engine (e.g., the management device 110) for storing files in the storage medium 120.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 130) to facilitate data communications. The communication port 225 may establish connections the management device 110 and the storage medium 120, and/or any other component of the data storage system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
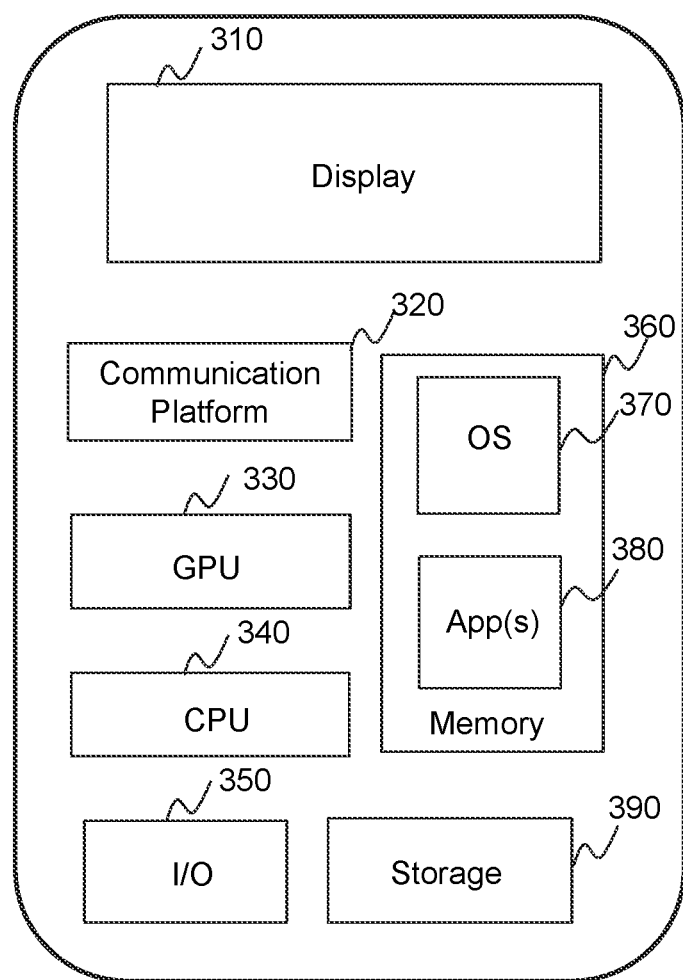
FIG. 3 is a schematic diagram illustrating exemplary components of an example mobile device according to some embodiments of the present disclosure.

FIG. 3 is a schematic diagram illustrating exemplary components of an exemplary user device according to some embodiments of the present disclosure. As illustrated in FIG. 3, the mobile device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The mobile device 300 may be an embodiment of management device 110 and the storage medium 120. The applications 380 may include a storage manager for managing data stored in the mobile device 300.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
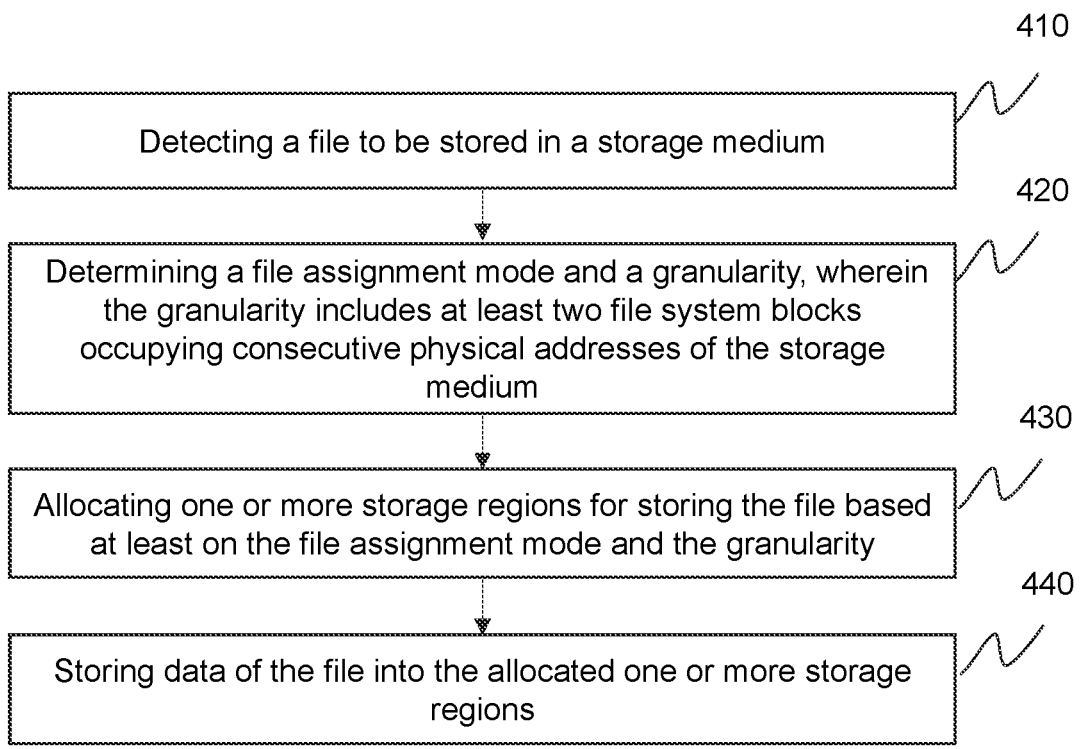
FIG. 4 illustrates an exemplary process for storing data in a storage medium according to some embodiments of the present disclosure.

FIG. 4 is a flow chart illustrating an exemplary process for storing data in a storage medium according to some embodiments of the present disclosure. In some embodiments, the process 400 shown in FIG. 4 may be implemented in the data storage system 100 illustrated in FIG. 1. For example, at least a part of the process 400 may be stored in a storage (e.g., the storage medium 120) as a form of instructions, and invoked and/or executed by the management device 110 (e.g., the processor 222 of the computing device 200 or one or more modules illustrated in FIG. 6). In some embodiments, a part of the process 400 may be implemented on a terminal device. The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

Figure 6:
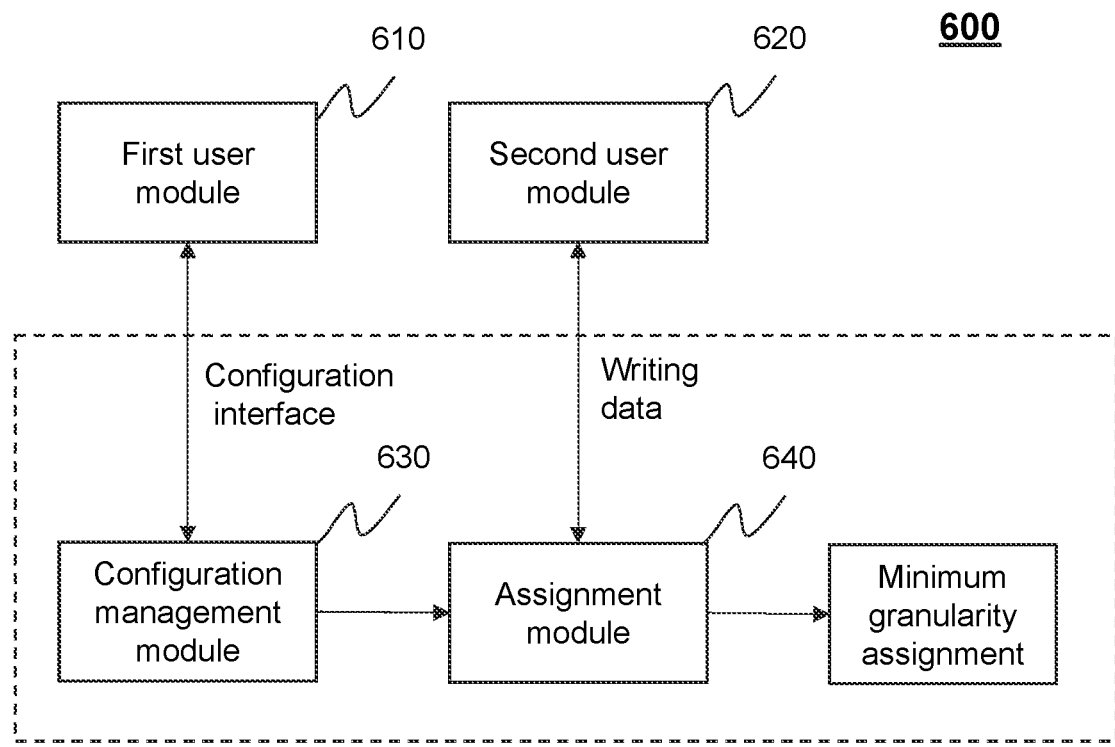
FIG. 6 is a schematic diagram of an exemplary management device according to some embodiments of the present disclosure.

In 410, the management device 110 (e.g., the processor 222 of the computing device 200 or one or more modules illustrated in FIG. 6) may detect a file to be stored in a storage medium. In some embodiments, the management device 110 may receive an instruction of writing the file to be stored into the storage medium. After the instruction is received, the management device 110 may detect the file to be stored in the storage medium.

The file to be stored may be a picture, a text file, a video, a database, a folder including one or more files, a directory file associated with the folder (e.g., a file indexing all the files in the folder), etc. In some embodiments, the file to be stored may have a detectable size. For example, the file to be stored may be a copyfile (i.e., a copy of a file) having a specific size. In some embodiments, the file to be stored may have an undetectable size. The file to be stored may be a file continuously written into the storage region. For example, the file may be a video acquired from a video monitor camera which continuously records target scenes.

The storage medium into which the file is to be stored may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. The storage medium may be a local storage device (e.g., the storage medium 120) or a remote storage device (e.g., a cloud storage).

In 420, the management device 110 (e.g., the processor 222 of the computing device 200 or one or more modules illustrated in FIG. 6) may determine a file assignment mode and a granularity, wherein the granularity includes at least two file system blocks occupying consecutive physical addresses of the storage medium.

The granularity, also referred to as file assignment granularity, may refer to a minimum storage space allocated by the data storage system 100 for storing files. In a Linux environment, a file system block may be used as a unit storage (i.e., a default minimum storage space) for storing files. The size of the file system block may be 512 bytes, 1 KB, 2 KB, 4 KB, etc.

The granularity includes at least two file system blocks occupying consecutive physical addresses of the storage medium. In this case, the granularity size may equal the size of at least two file system blocks, and the at least two file system blocks may be consecutive in physical addresses of the storage medium. The granularity size may refer to the size of the minimum storage space allocated by the management device 110 for storing files. In some embodiments, the granularity size may be an integral multiple of the size of a file system block (also referred to as file system block size). For example, the granularity size may be twice the file system block size.

In some embodiments, in a process of storing a file, the management device 110 may allocate one or more storage regions for storing the file according to the size of the file and the granularity. Each of the one or more storage regions may include at least two file system blocks occupying consecutive physical addresses in the storage medium. In some embodiments, each storage region may correspond to a granularity. Taking a granularity size of 4 KB as an example, if the remaining storage space of the storage medium is sufficient and the size of the file to be stored is 32 KB, one or more storage regions having a total size of 32 KB (i.e., 8 granularities) may be allocated for storing the file by the management device 110. If the size of the file is smaller than 4 KB, a storage region having a size of 4 KB (i.e., 1 granularity) may be allocated for storing the file by the management device 110.

The file assignment mode may be a mode in which the management device 110 allocates one or more storage regions for a file. In some embodiments, the file assignment mode may include a single granularity mode, a multiple granularity mode, etc. In the single granularity mode, the management device 110 may set a uniform granularity for each file. For example, if the granularity size is 16 MB, regardless of the type of the file to be stored, the granularity for each file to be stored is set to 16 MB by the management device 110.

In the multiple granularity mode, the management device 110 may set different granularities for different files to be stored according to the types of the files. For example, if the files to be stored include video files, picture files, document files, and other files (the types of the files are unidentifiable or undetectable), the granularity size for a video file, the granularity size for a picture file, and the granularity size for a document file may be set to 64 MB, 2 MB, and 1 MB, respectively, and the granularity size for a file of other types may be set to 16 MB.

Further, in the multiple granularity mode, if the types of the files to be stored are the same, the management device 110 may also set different granularity sizes for one or more files to be stored according to the contents of the files, the formats of the files, the names of the files, the attributes of the files, or the like, or any combination thereof. For example, if one or more files to be stored are video files, and the contents of the files include short videos, TV dramas, movies, and, the granularity sizes of short videos, TV dramas, movies may be set to 16 MB, 1 MB, 3 GB by the management device 110, respectively. As another example, when one or more files to be stored are video files, and the formats of the files include MP4, AVI, Rmvb, and 3gp, the granularity sizes of the MP4 files, AVI files, Rmvb files, and the 3gp files may be set to 16 MB, 32 MB, 512 MB, and 8 MB, respectively.

The granularity size may be set by a user, according to default settings of the data storage system 100, the file assignment mode, or the like. The granularity size may be an integral multiple of a file system block.

In 430, the management device 110 (e.g., the processor 222 of the computing device 200 or one or more modules illustrated in FIG. 6) may allocate one or more storage regions for storing the file based at least on the file assignment mode and the granularity.

Each of the one or more storage regions may include at least two file system blocks occupying consecutive physical addresses in the storage medium. In some embodiments, each storage region may correspond to a granularity.

In the single granularity mode, the management device 110 may not identify the type of the file to be stored, and the granularity may have a first granularity size. The first granularity size may be a constant. For example, if the granularity size is 16 MB, the granularity size for the file to be stored may be set to 16 MB regardless of the type of the file.

In the multiple granularity mode, the granularity may have the second granularity size which is set according to the file (e.g., the type of the file, the content of the file, the format of the file, etc.). The file to be stored may include a video file, an image file, a database file, or the like, other files of unidentifiable types, etc. Different second granularity sizes may be set for files of different types. For example, a video file may have a larger amount of data, and the granularity size of the video file may be set to 64 MB. An image file may have a smaller amount of data, the granularity size of the image file may be set to 2 MB. As for a database file, the granularity size of the database file may be set to 32 MB. As for other types of files, the granularity size may be set to 16 MB.

In some embodiments, the type of the file to be stored may be identified. And a target second granularity size corresponding to the type of the file may be determined. The one or more storage regions for storing the file according to the target second granularity size may be allocated.

In some embodiments, when the management device 110 detects a file to be stored, the type of file may be obtained according to the attribute of the file. The target second granularity size corresponding to the type of the file may be determined, and the one or more storage regions may be allocated according to the target second granularity size.

For example, when the management device 110 detects a file to be stored is a video file, one or more storage regions, each having a granularity size of 32 MB, may be allocated for the file. when the management device 110 detects that the file to be stored is a picture file, one or more storage regions, each having a granularity size of 2 MB, may be allocated for the file. when the management device 110 detects that the file to be stored is a database file, one or more storage regions, each having a granularity size of 16 MB, may be allocated for the file.

The granularity size may be any suitable size set according to actual requirements. It should be noted that the examples regarding the granularity size provided herein are for illustration purposes, and not intended to limit the scope of the present disclosure.

The number of the one or more storage regions for storing the file may be calculated according to the size of the file and the granularity. Storage regions of the calculated number may be allocated for storing the data of the file.

Merely for illustration purposes, if the file to be stored is a copyfile, the actual size of the file may be obtained through the attribute of the copyfile. For example, if the actual size of the file is 32 MB, and the granularity size is 16 MB, the management device 110 may calculate the number of storage regions accommodating the file. The number of the storage regions may be 32/16=2. The file system may allocate 2 storage regions for storing the file. However, if the actual size of the file is 50 MB, 16 is an aliquant part of 50 (50/16=3.125). In order to ensure that all the data of the file is stored, the file system may allocate 4 storage regions for storing the file. The number of storage regions allocated by the file system for storing a file may be an integral multiple of the granularity, and the storage regions allocated for storing the data of the file need to be greater than or equal to the actual size of the file.

In some embodiments, the one or more storage regions may be consecutive in physical addresses if the storage medium has a sufficient space for data storage. In some embodiments, at least a part of the one or more storage regions may be consecutive in physical addresses.

In 440, the management device 110 (e.g., the processor 222 of the computing device 200 or one or more modules illustrated in FIG. 6) may store data of the file into the allocated one or more storage regions.

If the management device 110 may allocate the one or more storage regions, at least a part of which occupy consecutive physical addresses, for storing the data of the file, the data of the file may be continuously stored when the data of the file is written into the allocated storage regions. When the stored data needs to be read, the time for searching a magnetic head associated with positions of the stored data in the storage medium may be reduced, and the performance of the management device 110 may be improved.

Figure 5:
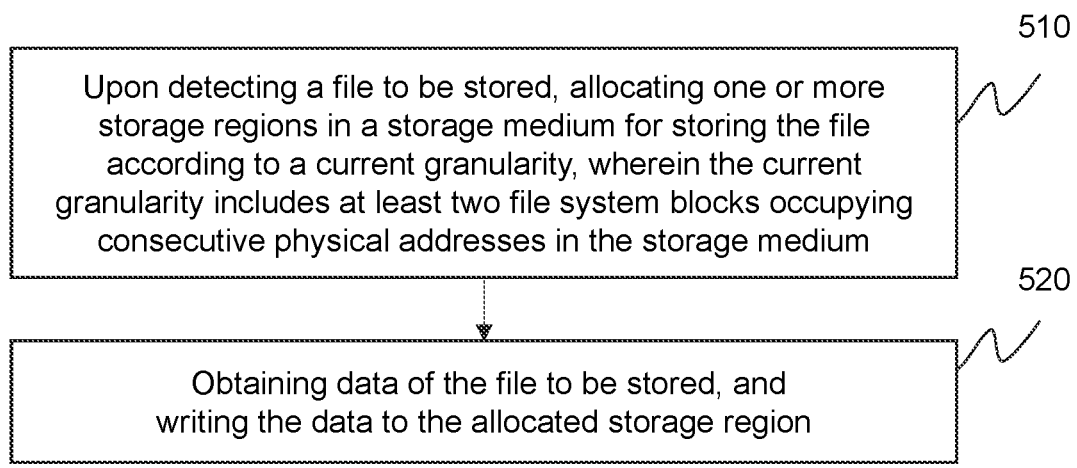
FIG. 5 is a flow chart illustrating an exemplary process for storing data in a storage medium according to some embodiments of the present disclosure.

FIG. 5 is a flow chart illustrating an exemplary process for storing data in a storage medium according to some embodiments of the present disclosure. In some embodiments, the process 500 shown in FIG. 5 may be implemented in the data storage system 100 illustrated in FIG. 1. For example, at least a part of the process 500 may be stored in a storage (e.g., the storage medium 120) as a form of instructions, and invoked and/or executed by the management device 110 (e.g., the processor 222 of the computing device 200 or one or more modules illustrated in FIG. 6). In some embodiments, a part of the process 500 may be implemented on a terminal device. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, upon detecting a file to be stored, the management device 110 (e.g., the processor 222 of the computing device 200 or one or more modules illustrated in FIG. 6) may allocate one or more storage regions of a storage medium for storing the file according to a current granularity.

A current granularity (also referred to as current file assignment granularity) refers to a granularity currently stored in the management device (e.g., the configuration management module 630) for storing data of a file to be stored. In some embodiments, the current granularity includes at least two file system blocks occupying consecutive physical addresses of the storage medium. Therefore, in comparison with the prior art, the method of the present disclosure increases the granularity size of the file system, and ensures that the storage regions allocated by the management device 110 occupy consecutive physical addresses of the storage medium.

Merely for illustration purposes, the data of the file to be stored is 32 KB, the granularity in the prior art is a constant 4 KB. In an extreme case, the management device 110 may need to allocate, in 8 times, 8 file system blocks for storing the data of the file. Since the management device 110 allocates one file system block for storing the data of the file each time, the physical addresses of the allocated file system blocks may not be consecutive. Thus, the data of the file may be staggered at discrete physical addresses of the storage medium.

However, according to some embodiments of the present disclosure, since the granularity includes at least two file system blocks occupying consecutive physical addresses, if the granularity size is 8 KB, the management device 110 may need to allocate, in 4 times, 4 storage regions for storing the data of the file. If the granularity size is 16 KB, the management device 110 may need to allocate, in 2 times, 2 storage regions for storing the data of the file. In some embodiments, if the granularity size is 32 KB, the management device 110 may allocate, in one time, one storage region for storing the data of the file.

In terms of the comparison above, if the granularity size is larger and closer to the amount of the data of the file to be stored, the number of storage regions and the times for allocating the storage regions may be less. In addition, the allocated storage regions may occupy consecutive physical addresses, thus reducing the fragmentation rate of the storage medium.

In 520, the management device 110 (e.g., the processor 222 of the computing device 200 or one or more modules illustrated in FIG. 6) may obtain the data of the file to be stored, and writing the data to the allocated storage regions.

Since the management device 110 may allocate the storage regions occupying consecutive physical addresses for storing the data of the file, when the data of the file is written into the allocated storage regions, the data of the file may be continuously stored. When the stored data needs to be read, the time for searching a magnetic head and the time for waiting data may be reduced, and the performance of the management device 110 may be improved.

According to some embodiments of the present disclosure, the granularity may include at least two file system blocks occupying consecutive physical addresses. The data of the file may be stored into storage regions occupying consecutive physical addresses, which reduces the times for allocating the storage regions, and increases the continuity of the data of the file stored at the physical addresses. In this way, the fragmentation rate of the storage medium 120, the time consumed for searching the magnetic head, and the load of CPU may be reduced, thereby improving the read/write performance of the management device 110.

In some embodiments, the storage region may be allocated in different ways according to different file assignment modes. The file assignment modes may include a single granularity mode or a multiple granularity mode.

The single granularity mode refers that the management device 110 allocates storage regions with a unified granularity for storing data of various files. The multiple granularity mode refers that the management device 110 allocates storage regions for storing data of a file according to the file (e.g., a type of the file).

In some embodiments, the granularity may have a first granularity size or a second granularity size. The first granularity size may be a constant. The second granularity size may vary according to the file (e.g., the type of the file).

If the management device 110 employs the single granularity mode to allocate the one or more storage regions, the management device 110 may not identify the type of the file to be stored, and the granularity may have the first granularity size. For example, if the granularity size is 16 MB, the granularity size of the file to be stored may be set to 16 MB regardless of the type of the file.

If the management device 110 employs the multiple granularity mode to allocate the one or more storage regions, the granularity may have the second granularity size which is set according to the file (e.g., the type of the file, the content of the file, the format of the file, etc.). To allocate the storage region of the storage medium for storing the file according to the current granularity, one or more of the following operations may be performed. The type of the file to be stored may be identified. A target second granularity size corresponding to the type of the file may be determined. The storage region for storing the file according to the target second granularity size may be allocated.

The file to be stored may include a video file, an image file, a database file, or the like, or other files of unpredictable types. Different second granularity sizes may be set for different types of files. For example, in general, a video file may have a larger amount of data, the granularity size of the video file may be set to 64 MB. An image file may have a smaller amount of data, the granularity size of the image file may be set to 2 MB. As for a database file, the granularity size of the database file may be set to 32 MB. As for other types of files, the granularity size may be set uniformly to 16 MB.

When the management device 110 detects that there is a file to be stored, the type of file may be determined according to the attribute of the file. The granularity corresponding to the type of the file may be determined, and the one or more storage regions may be allocated according to the granularity.

For example, if the management device 110 detects that the file to be stored is a video file, the one or more storage regions with a granularity size of 32 MB may be allocated for the file. If the management device 110 detects that the file to be stored is a picture file, the one or more storage regions with a granularity size of 2 MB may be allocated for the file. If the management device 110 detects that the file to be stored is a database file, the one or more storage regions with a granularity size of 16 MB may be allocated for the file. If the management device 110 detects that the file to be stored is a file of types other than the video file, picture file, and database file, the one or more storage regions with a granularity size of 16 MB may be allocated for the file.

The granularity size may be any suitable size set according to a user's requirements. It should be noted that the examples regarding the granularity size provided herein are for illustration purposes, and not intended to limit the scope of the present disclosure.

In some embodiments, the granularity has the first granularity size or the second granularity size. The first granularity size may be a constant. The second granularity size may vary according to the file (e.g., the type of the file). It is sufficient to satisfy requirements of different applications scenarios, thereby improving the utility of allocating storage regions according to the two file assignment modes.

In actual applications, the file to be stored may be a copyfile or a new file, and storage regions for storing the copyfile and the new file may be allocated in different ways. In some embodiments, if the detected file is a copyfile, to allocate one or more storage regions for storing the file according to the current granularity, one or more of the following operations may be performed. The size of the file may be obtained.

The number of storage regions for storing the file may be calculated according to the size of the file and the current granularity. Storage regions of the calculated number may be allocated for storing the data of the file.

If the file to be stored is a copyfile, the actual size of the file may be obtained through the attribute of the copyfile. For example, if the actual size of the file is 32 MB, and the current granularity size is 16 MB, the management device 110 may calculate the number of storage regions accommodating the file.

The number of the storage regions may be 32/16=2. The management device 110 may allocate 2 storage regions for storing the file. However, if the actual size of the file is 50 MB, 16 is an aliquant part of 50 (50/16=3.125). In order to ensure that all the data of the file is stored, the management device 110 may allocate 4 storage regions for storing the file. The number of storage regions allocated by the management device 110 for storing a file may be an integral multiple of the granularity, and the storage regions allocated for storing the data of the file need to be greater than or equal to the actual size of the file.

If the file to be stored is a copyfile, one or more storage regions for storing the data of the file may be allocated at one time. Therefore, when the one or more storage regions are allocated, the probability that the one or more storage regions occupy consecutive physical addresses on the storage medium may be greatly increased, and the fragmentation rate of the storage medium 120 may also be reduced, and the time consumed for searching magnetic heads and the load of CPU may be reduced, thereby improving the read/write performance of the management device 110.

In some embodiments, if the detected file is a new file being continuously written into the storage medium, to allocate the one or more storage regions for storing the file according to the current granularity, one or more of the following operations may be performed. The one or more operations may include A. allocating a storage region of the current granularity for storing the file, and writing the data of the file into the storage region; B. determining whether data currently written into the storage region fills the allocated storage region. If it is determined that the data currently written into the storage region fills the allocated storage region, proceed to A. Otherwise, proceed to C; C. stopping the allocation of storage regions for the data of the file.

In another word, if the file to be stored is a new file being continuously written into the storage medium, the size of the file may be undetectable, the management device 110 may allocate one storage region for storing the file at one time. In some embodiments, if the file to be stored is a new file being continuously written into the storage medium, one storage region of the current granularity may be allocated for the file. For example, If the current granularity size is 16 MB, a storage region of 16 MB may be allocated for the file. Then it is determined whether the data currently written into the storage region fills the allocated storage region. If the data currently written is 8 MB, the allocated storage region may satisfy the storage requirement of the file (8 MB is less than 16 MB), and there is no need to allocate more storage regions for the file. If the data of the file currently written fills the allocated storage region, it may indicate that there is still data to be stored, and the management device 110 may allocate another storage region until the entire file is written into the storage medium.

According to some embodiments of the present disclosure, the granularity may include at least two file system blocks occupying consecutive physical addresses. The data of the file may be stored into storage regions occupying consecutive physical addresses, which reduces the times for allocating the storage regions, and increases the continuity of the data of the file stored at the physical addresses. In this way, the fragmentation rate of the storage medium 120, the time consumed for searching the magnetic head, and the load of CPU may be reduced, thereby improving the read/write performance of the management device 110.

FIG. 6 is a schematic diagram of an exemplary management device according to some embodiments of the present disclosure. The management device 600 may include a first user module 610, a second user module 620, a configuration management module 630 connected to the first user module 610, and an assignment module 640 connected to the second user module 620 and the configuration management module 630.

In some embodiments, the first user module 610 and the second user module 620 may relate to a user mode or a kernel mode. The user mode refers to an active space for upper layer applications, and the function of the applications relay on the resources (e.g., CPU resources, storage resources, I/O resources, etc.) provided by a kernel. The kernel mode refers that hardware resources that control a computer and provide a running environment for the upper layer applications. It should be understood that the first user module 610 and/or the second user module 620 may not be specifically related to the user mode or the kernel mode in the present disclosure.

In some embodiments, the first user module 610 may be configured to set or query information related to the granularity (also referred to granularity related information) through a configuration interface provided by the configuration management module 630. The configuration interface may be implemented by means of procfs, ioctl, tools and interfaces of the management device 110.

The configuration management module 630 may be configured to store the granularity related information or transmit the granularity related information to the assignment module 640.

The second user module 620 may be configured to write the data of the file into the storage medium through a writing interface provided by the assignment module 640, and allocate, by the assignment module 640, one or more storage regions for storing the data of the file.

The assignment module 640 may be configured to obtain the current granularity from the configuration management module 630, and allocate one or more storage regions for storing the data of the file according to the amount of data written by the second user module 620.

Figure 7:
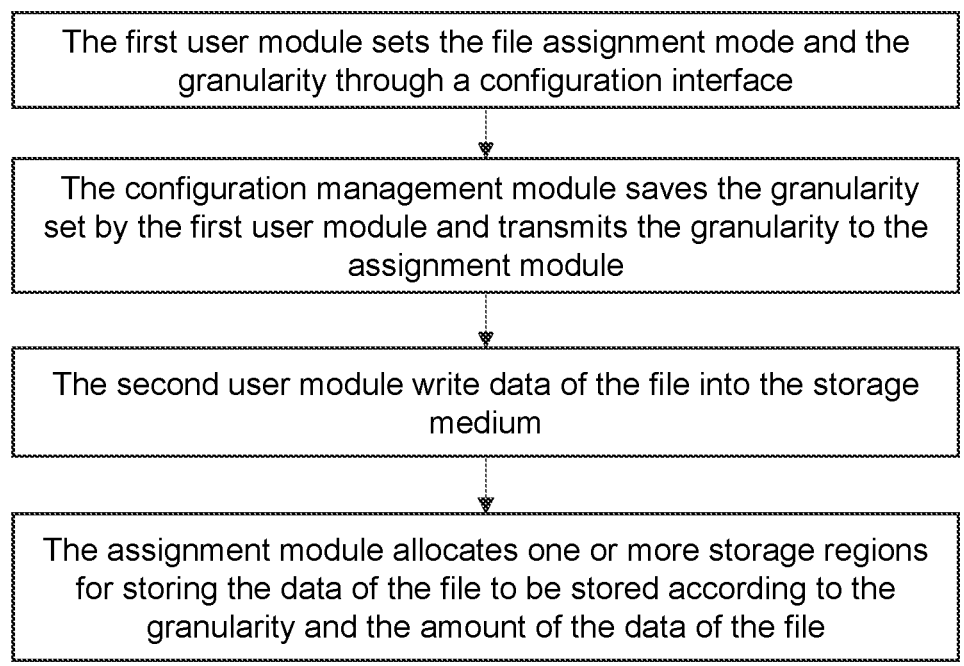
FIG. 7 is a flowchart illustrating an exemplary process for data storage of an exemplary management device according to some embodiments of the present disclosure.

FIG. 7 is a flowchart illustrating an exemplary process for data storage of an exemplary management device according to some embodiments of the present disclosure.

The first user module 610 may set the file assignment mode and the granularity of the management device 110 through the configuration interface, and the configuration management module 630 may store the granularity set by the first user module 610 and transmit the granularity size to the assignment module 640. When the second user module 620 writes data of the file into the storage medium, the assignment module 640 may allocate one or more storage regions for storing the data according to the current granularity stored in the configuration management module 630 and the amount of the data written by the second user module 620.

In some embodiments, when the assignment module 640 allocates the one or more storage regions for storing the data, the following rules may be followed.

If the amount of the data of the file is less than or equal to the current granularity, one storage region of the current granularity may be allocated for the file. If the amount of data is greater than the current granularity, the size of storage regions allocated for storing the file may be an integral multiple of the current granularity size.

In some embodiments, when the assignment module 640 allocates storage regions for storing a file to be stored, a method block allocation inherent in the management device 110, a pre-allocation mechanism inherent in the management device 110, a combination of the block allocation method or the pre-allocation mechanism and a caching mechanism of the management device 110, etc. It may be understood that the manner in which storage regions are allocated in the present disclosure may not be specifically limited.

The block allocation method, the pre-allocation mechanism inherent in the management device 110, or the combination of the block allocation method or the pre-allocation mechanism and the caching mechanism of the management device 110 are common knowledge in the art, which may not be described in detail in the present disclosure.

In some embodiments, the file to be stored may be a directory file (i.e., a catalogue file) under a certain folder. The management device 110 may store a granularity for the folder such that all the files under the folder may be stored according to the corresponding granularity.

In some embodiments, if the detected file is a directory file, before the storage regions are allocated for storing the file according to the current granularity, a folder corresponding to the file to be stored may be determined, and a pre-stored target granularity regarding the folder may be obtained.

A determination may be made as to whether the current granularity is consistent with the target granularity. If the current granularity is consistent with the target granularity, the process may proceed to subsequent steps.

For example, if the file to be stored is a video file, the granularity for the video file may be set to 64 MB. If the file is a directory file under a folder A, and the pre-stored target granularity regarding the folder A is also 64 MB, one or more storage regions with the current granularity of 64 MB may be to allocate for storing the video file.

However, if the pre-stored target granularity regarding the folder A is 128 MB, the target granularity regarding the folder A may be modified to 64 MB in order to ensure a consistency between the current granularity and the target granularity.

Therefore, in some embodiments, if the current granularity is inconsistent with the target granularity, the target granularity may be modified according to the current granularity.

Figure 8:
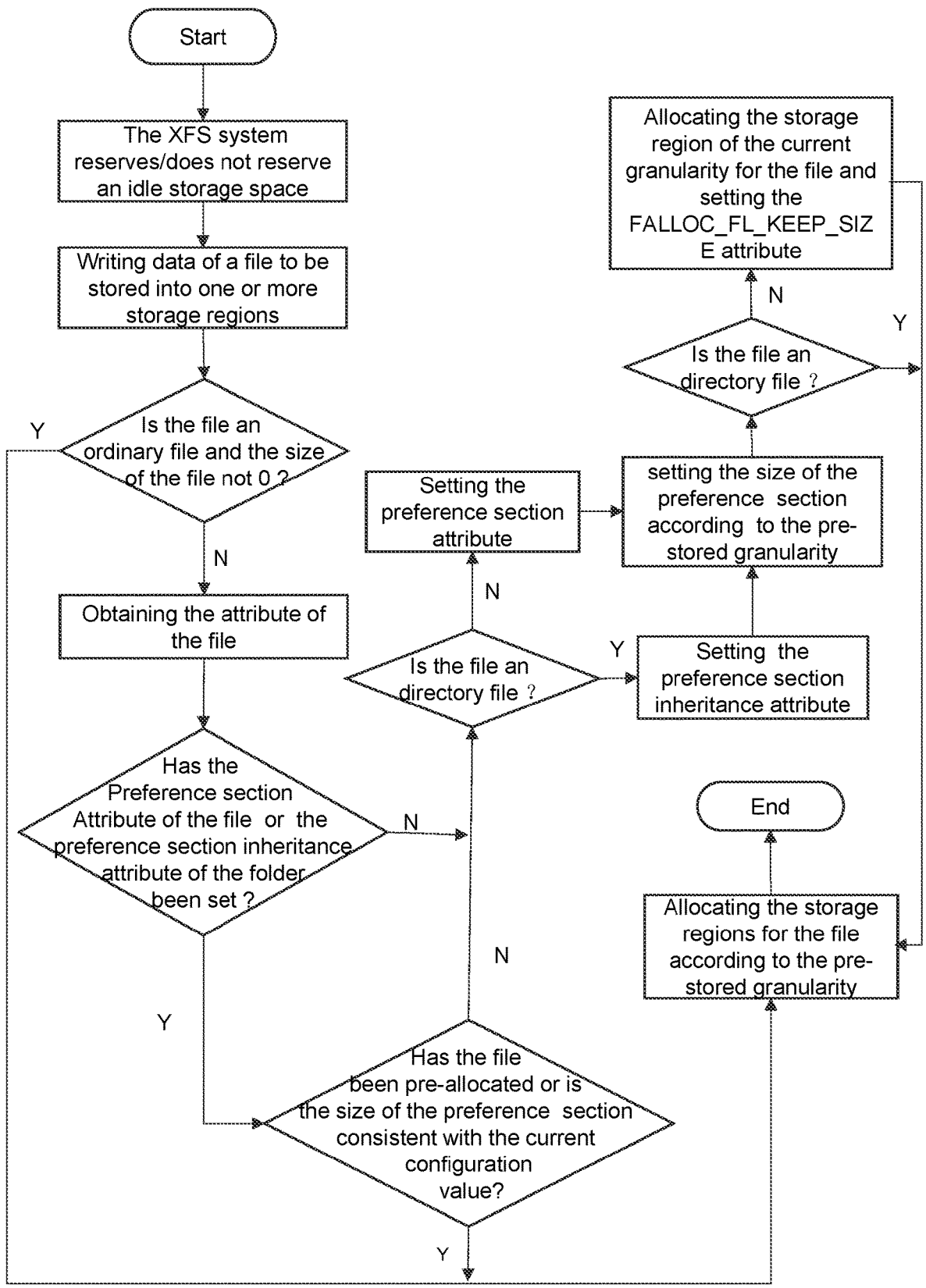
FIG. 8 is a flowchart illustrating an exemplary process for data storage of an XFS system according to some embodiments of the present disclosure.

FIG. 8 is a flowchart illustrating an exemplary process for data storage of an XFS system according to some embodiments of the present disclosure.

The XFS system may establish an inode corresponding to a file to be stored before the data of the file is stored. The inode may include an attribute area and an extended attribute area. The attribute area may be used for storing the size of the file and the type of the file. The extended attribute area may be used for storing a preference section attribute for each file, or a preference section inheritance attribute for each folder. The preference section attribute may be the granularity stored for each file, and the preference section inheritance attribute may be the granularity stored for each folder.

For example, if the granularity for a video file is 32 MB, the preference section attribute of the video file may be set to 32 MB, which may be used as an allocation label when the video file is stored. When the video file is stored, the storage region assignment may be performed according to the preference section attribute of the video file. If the granularity for a folder is 16 MB, the preference section inheritance attribute of the folder may be set to 16 MB, which may be used as an allocation label when files under the folder are stored into the storage medium. For a directory file under the folder, storage regions may be allocated according to the preference section inheritance attribute of the folder.

In order to increase the probability that the data of the file written into the storage medium occupies consecutive physical addresses, idle storage regions may be reserved in the XFS system. It should be noted that, in some embodiments, the idle storage regions are not specifically limited.

When data of a file to be stored is written to a storage region, a determination as to whether the file is an ordinary file may be made. The ordinary file may be denied as a file used to store data of different types, such as binary data, databases, or data of other types. If the file is an ordinary file, one or more storage regions may be directly allocated for the file to be stored according to a pre-stored granularity.

If the file to be stored is not an ordinary file, it may indicate that the file may be a directory file or files other types. The attribute information of the file may need to be obtained from an inode of the file. The attribute information may indicate the type the file. If the file to be stored is a directory file, a folder corresponding to the file maybe determined, and a preference section inheritance attribute of the folder may be obtained. Otherwise, preference section attribute of the file may be acquired so as to obtain the type of the file.

If the file to be stored is not the first time written into the storage medium, the preference section attribute of the file may already be set. One or more storage regions may be allocated for the file according to the preference section attribute of the file. If the file to be stored is the first time written into the storage medium, it may be necessary to determine whether the file is a directory file. If the file is not a directory file, the preference section attribute of the file may be set according to the current granularity such that one or more storage regions for storing the file may be allocated according to the preference section attribute of the file. If the file is a directory file, a folder corresponding to the file may be obtained, and the preference section inheritance attribute of the folder may be set. In some embodiments, the preference section attribute of the file should be the same as the preference section inheritance attribute of the folder corresponding to the file.

If the file to be stored is the first time written into the storage medium, the management device 110 may also set the FALLOC_FL_KEEP_SIZE attribute of the file so as to ensure that the allocated one or more storage regions for storing the data have the current granularity size, and the actual amount of the data currently written may be determined via a stat series function (stat, fstat, lstat, fstatat) based on data subsequently written into the storage medium.

In the process of allocating one or more storage regions, it may be ensured that an XFS block allocator may allocate, according to a size set in a preference section of a folder corresponding to the file, consecutive storage regions in a storage medium for storing a file by setting the preference section attribute or the preference section inheritance attribute. Since a pre-allocation and the size of the preference section are associated with the file, and are stored in the extended attribute area of the inode of the file, additional configuration files may not be required.

According to some embodiments of the present disclosure, the granularity may include at least two file system blocks occupying consecutive physical addresses such that the sizes of storage regions are not limited to a file system block or a linux page. The data of the file may be stored into storage regions occupying consecutive physical addresses, which reduces the times for allocating the storage regions, and increases the continuity of the data of the file stored at the physical addresses. In this way, the fragmentation rate of the storage medium 120, the time consumed for searching the magnetic head, and the load of CPU may be reduced, thereby improving the read/write performance of the management device 110.

Figure 9:
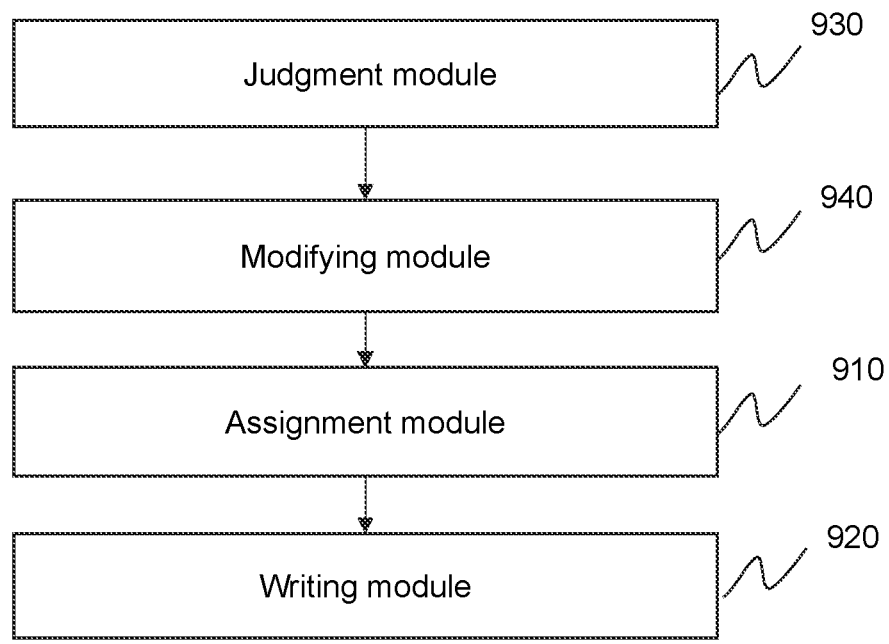
FIG. 9 is a schematic block diagram of a data storage device according to some embodiments of the present disclosure.

FIG. 9 is a schematic block diagram of a data storage device according to some embodiments of the present disclosure. The data storage device may include an assignment module 910 and a writing module 920.

The assignment module 910 may be configured to allocate one or more storage regions for storing a file to be stored according to a current granularity when the file is detected. The current granularity includes at least two file system blocks occupying consecutive physical addresses in the storage medium.

The writing module 920 may be configured to obtain data of the file to be stored, and write the data to the allocated one or more storage regions.

In some embodiments, the granularity has the first granularity size or the second granularity size. The first granularity size may be a constant. The second granularity size may vary according to the file (e.g., the type of the file).

In some embodiments, the assignment module 910 may be specifically configured to identify the type of the file to be stored, determine a target second granularity size corresponding to the type of the file, and allocate one or more storage regions for storing the file according to the target second granularity size.

In some embodiments, if the detected file is a copyfile (i.e., the size of the file is detectable), the assignment module 910 may be configured to obtain the size of the file, calculate the number of storage regions accommodating the file according to the size of the file and the current granularity, and allocate storage regions of the calculated number for storing data of the file.

In some embodiments, if the detected file to be stored is a new file being continuously written into the storage medium, the assignment module 910 may be configured to A. allocate a storage region of the current granularity for storing the file, and write the data of the file into the storage region; B. determine whether data currently written into the storage region fills the allocated storage region. If it is determined that the data currently written into the storage region fills the allocated storage region, proceed to A. Otherwise, proceed to C; C. stop the allocation of storage regions for the data of the file.

In some embodiments, if the detected file is a directory file, the data storage device may further include a judgment module 930 and a modifying module 940.

The judgment module 930 may be configured to determine a folder corresponding to the file to be stored, obtain a pre-stored target granularity regarding the folder, and determine whether the current granularity is consistent with the target granularity. if the current granularity is consistent with the target granularity, further operations may be performed.

The modifying module 940 may be configured to modify the target granularity to be the current granularity if the current granularity is inconsistent with the target granularity.

Figure 10:
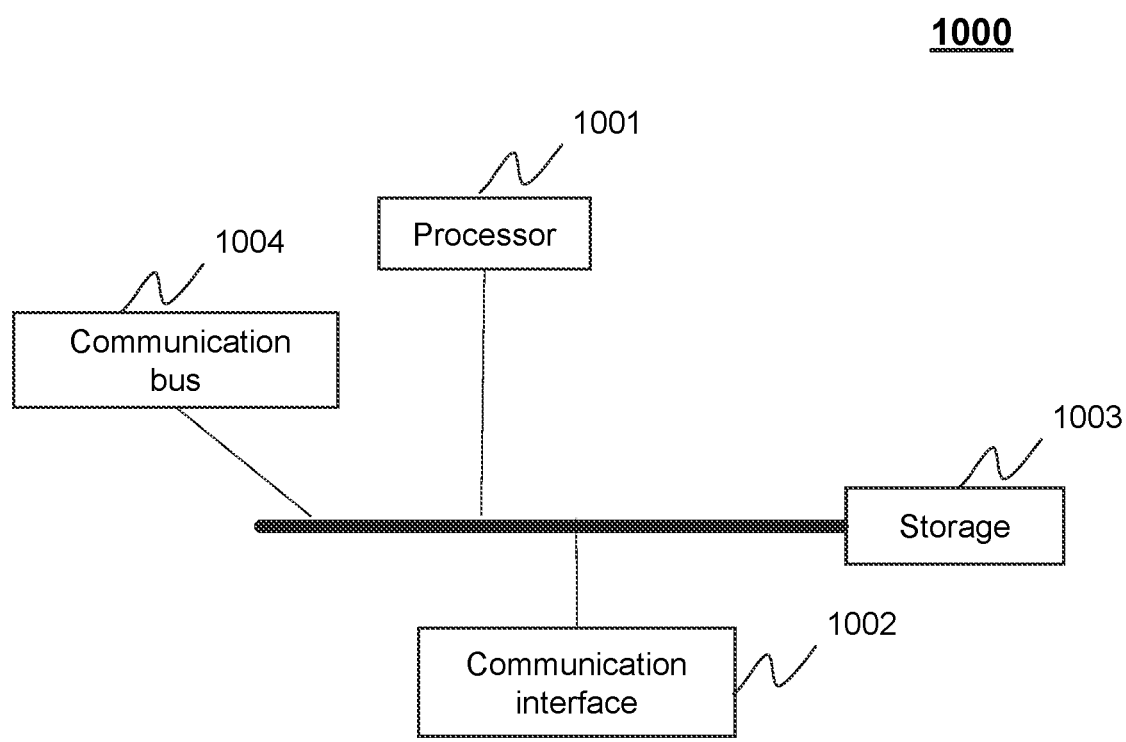
FIG. 10 is a schematic diagram illustrating an exemplary electronic device implementing data storage on a storage medium according to some embodiments of the present disclosure.

FIG. 10 is a schematic diagram illustrating an exemplary electronic device implementing data storage on a storage medium according to some embodiments of the present disclosure.

The electronic device may include a processor 1001, a communication interface 1002, a storage 1003, and a communication bus 1004. The processor 1001, the communication interface 1002, and the storage 1003 may communicate with each other through the communication bus 1004.

A computer program may be stored in the storage 1003, and when the computer program is executed by the processor 1001, the processor 1001 may be caused to execute operations including upon detecting a file to be stored, allocating one or more storage regions in a storage medium for storing the file according to a current granularity, wherein the current granularity includes at least two file system blocks occupying consecutive physical addresses in the storage medium, obtain data of the file to be stored, and write the data to the allocated storage region.

In some embodiments, the granularity has the first granularity size or the second granularity size. The first granularity size may be a constant. The second granularity size may vary according to the file (e.g., the type of the file). In some embodiments, to allocate the one or more storage regions in the storage medium for storing the file according to the current granularity, the type of the file may be identified, a target second granularity size corresponding to the type of the file may be determined, and the one or more storage regions for storing the file may be allocated according to the target second granularity size.

In some embodiments, if the detected file is a copyfile (i.e., the size of the file is detectable), the size of the file may be obtained, the number of storage regions accommodating the file may be calculated according to the size of the file and the current granularity, and storage regions of the calculated number may be allocated for storing data of the file.

In some embodiments, if the detected file to be stored is a new file being continuously written into the storage medium, one or more of the following operations may be performed. The one or more operations may include: A. allocating a storage region of the current granularity for storing the file, and writing the data of the file into the storage region; B. determining whether data currently written into the storage region fills the allocated storage region. If it is determined that the data currently written into the storage region fills the allocated storage region, proceed to A. Otherwise, proceed to C; C. stopping the allocation of storage regions for the data of the file.

In some embodiments, if the detected file is a directory file, a folder corresponding to the file to be stored may be determined, a pre-stored target granularity regarding the folder may be obtained, and whether the current granularity is consistent with the target granularity may be determined. if the current granularity is consistent with the target granularity, further operations may be performed.

In some embodiments, if the current granularity is inconsistent with the target granularity, the target granularity may be modified as the current granularity.

The communication bus 1004 of the electronic device may be a Peripheral Component Interconnect (PCI) bus or an Extended Industry Standard Architecture (EISA) bus, or the like. The communication bus 1004 may include an address bus, a data bus, a control bus, or the like. For purposes of illustration, a bold line is shown in FIG. 10, the number or type of the bus 1004 is not limited in the present disclosure.

The communication interface 1002 may be used for communication between the electronic device and other devices.

The storage 1003 may include a random access memory (RAM), or a non-volatile memory (NVM), such as at least one disk storage. Optionally, the storage 1003 may also be at least one storage device located remotely from the processor 1001.

The processor 1001 may be a general-purpose processor (e.g., a central processor, a network processor (NP), or the like), a digital signal processor (DSP), an application specific integrated circuit, a field programmable gate display or other programmable logic device, a discrete gate or transistor logic device, a discrete hardware component, or the like.

According to another aspect of the present disclosure, a computer readable storage medium may be provided. The computer readable storage medium may store a computer program executable by an electronic device such that the electronic device performs the following operations when the program runs on the electronic device: upon detecting a file to be stored, allocating one or more storage regions in a storage medium for storing the file according to a current granularity, wherein the current granularity includes at least two file system blocks occupying consecutive physical addresses in the storage medium, obtain data of the file to be stored, and write the data to the allocated storage region.

In some embodiments, the granularity has the first granularity size or the second granularity size. The first granularity size may be a constant. The second granularity size may vary according to the file (e.g., the type of the file). In some embodiments, to allocate the one or more storage regions in the storage medium for storing the file according to the current granularity, the type of the file may be identified, a target second granularity size corresponding to the type of the file may be determined, and the one or more storage regions for storing the file may be allocated according to the target second granularity size.

In some embodiments, if the detected file is a copyfile (i.e., the size of the file is detectable), the size of the file may be obtained, the number of storage regions accommodating the file may be calculated according to the size of the file and the current granularity, and storage regions of the calculated number may be allocated for storing data of the file.

In some embodiments, if the detected file to be stored is a new file being continuously written into the storage medium, one or more of the following operations may be performed. The one or more operations may include: A. allocating a storage region of the current granularity for storing the file, and writing the data of the file into the storage region; B. determining whether data currently written into the storage region fills the allocated storage region. If it is determined that the data currently written into the storage region fills the allocated storage region, proceed to A. Otherwise, proceed to C; C. stopping the allocation of storage regions for the data of the file.

In some embodiments, if the detected file is a directory file, a folder corresponding to the file to be stored may be determined, a pre-stored target granularity regarding the folder may be obtained, and whether the current granularity is consistent with the target granularity may be determined. if the current granularity is consistent with the target granularity, further operations may be performed.

In some embodiments, if the current granularity is inconsistent with the target granularity, the target granularity may be modified as the current granularity.

The computer readable storage medium may be any available media or data storage device that the processor in the electronic device can access, including but not limited to a magnetic memory such as a floppy disk, a hard disk, a magnetic tape, a magneto-optical disk (MO), an optical storage such as CD, DVD, BD, HVD, etc., a semiconductor memory such as ROM, EPROM, EEPROM, a non-volatile memory (NAND FLASH), a solid state drive (SSD), or the like.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in smaller than all features of a single foregoing disclosed embodiment.

I claim:

1. A method for managing the storage of files in a storage medium of a computing device, the method comprising:
    detecting a file to be stored in the storage medium, the file being a directory file;
    determining a file assignment mode and a granularity, wherein the granularity refers to a minimum storage space for storing files, a granularity size is determined according to a type of the file, and the granularity includes at least two file system blocks, the at least two file system blocks occupying consecutive physical addresses of the storage medium;
    determining a folder corresponding to the file to be stored;
    obtaining a pre-stored target granularity regarding the folder;
    determining whether the granularity is consistent with the pre-stored target granularity; and
    in response to the determination that the granularity is inconsistent with the pre-stored target granularity, modifying the pre-stored target granularity to be the granularity;
    allocating one or more storage regions for storing the file based at least on the file assignment mode and the granularity; and
    storing the file into the allocated one or more storage regions.

2. The method of claim 1, further comprising:
    obtaining a size of the file if the size of the file is detectable; and
    calculating the number of the storage regions for storing the file based on the file assignment mode, the granularity size, and the size of the file.

3. The method of claim 1, further comprising:
    if the size of the file is undetectable,
        allocating a storage region of the current granularity for storing the file, and writing the data of the file into the storage region;
        determining whether data currently written into the storage region fills the allocated storage region; and
        in response to the determination that the data currently written into the storage region does not fill the allocated storage region,
        stopping the allocation of storage regions for the data of the file.

4. The method of claim 1, wherein the file assignment mode is a single granularity mode or a multiple granularity mode.

5. The method of claim 4, wherein the single granularity mode relates to a first granularity size.

6. The method of claim 4, wherein the multiple granularity mode relates to a second granularity size, and the second granularity size is a variable.

7. The method of claim 6, wherein the second granularity size is further determined according to the content of the file, a format of the file, a name of the file, or an attribute of the file.

8. A device for managing the storage of files in a storage medium of a computing device, comprising the:
    at least one storage device including a set of instructions; and
    at least one processor configured to communicate with the at least one storage device, wherein when executing the set of instructions, the at least one processor is configured to direct the device to perform operations including:
        detecting a file to be stored in the storage medium, the file being a directory file;
        determining a file assignment mode and a granularity, wherein the granularity refers to a minimum storage space for storing files, a granularity size is determined according to a type of the file, and the granularity includes at least two file system blocks, the at least two file system blocks occupying consecutive physical addresses of the storage medium;
        determining a folder corresponding to the file to be stored;
        obtaining a pre-stored target granularity regarding the folder;
        determining whether the granularity is consistent with the pre-stored target granularity; and
        in response to the determination that the granularity is inconsistent with the pre-stored target granularity, modifying the pre-stored target granularity to be the granularity;
        allocating one or more storage regions for storing the file based at least on the file assignment mode and the granularity; and
        storing the file into the allocated one or more storage regions.

9. The device of claim 8, wherein the operations further comprise:
    obtaining a size of the file if the size of the file is detectable; and
    calculating the number of the storage regions for storing the file based on the file assignment mode, the granularity size, and the size of the file.

10. The device of claim 8, wherein the operations further comprise:
> if the size of the file is undetectable,
>> allocating a storage region of the current granularity for storing the file, and writing the data of the file into the storage region;
>> determining whether data currently written into the storage region fills the allocated storage region; and
>> in response to the determination that the data currently written into the storage region does not fill the allocated storage region,
>>> stopping the allocation of storage regions for the data of the file.

11. The device of claim 8, wherein the file assignment mode is a single granularity mode or a multiple granularity mode.

12. The device of claim 11, wherein the single granularity mode relates to a first granularity size.

13. The device of claim 11, wherein the multiple granularity mode relates to a second granularity size, and the second granularity size is a variable.

14. The device of claim 13, wherein the second granularity size is further determined according to the content of the file, a format of the file, a name of the file, or an attribute of the file.

* * * * *